Patented July 15, 1952

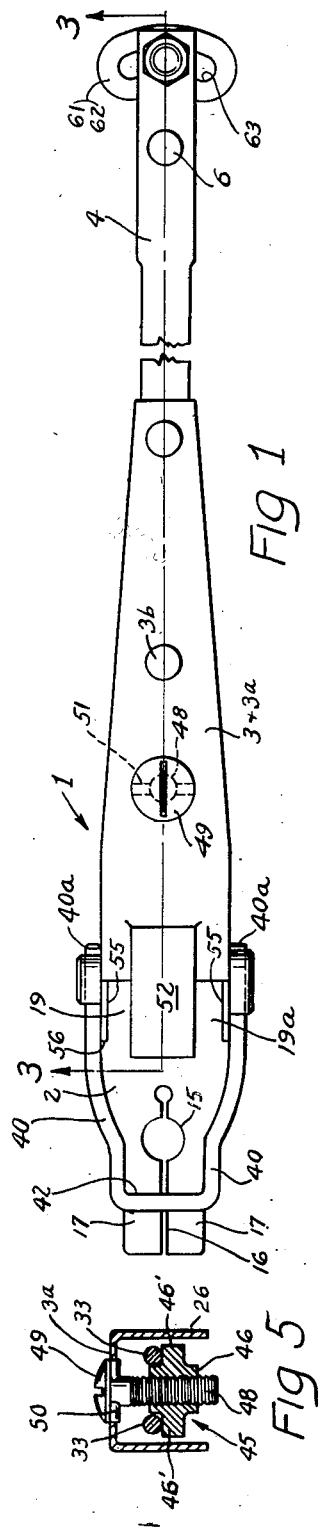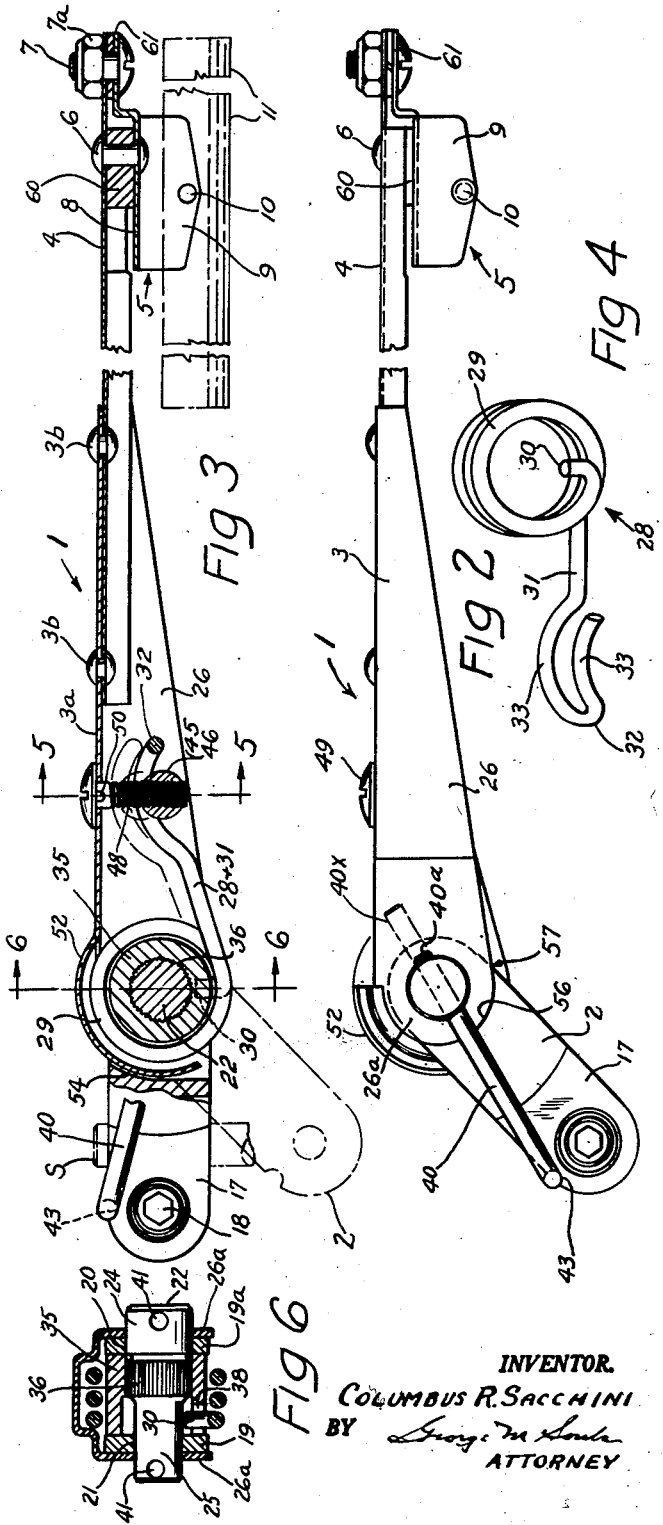

2,602,950

UNITED STATES PATENT OFFICE 2,602,950

WIPER DRIVE ARM MECHANISM

Columbus R. Sacchini, Willoughby, Ohio, assignor to The Marquette Metal Products Company, Cleveland, Ohio, a corporation of Ohio Application May 27, 1948, Serial No. 29,565

5 Claims. (Cl. 15—250)

The invention relates to a wiper drive arm assembly including an adjustable wiper blade mounting for windshield wipers and the like.

An object hereof is to provide an improved pivotally articulated drive arm assembly adapted for substantially rigid attachment to a drive shaft of conventional form, having provision for adjustably controlling the wiping force of the blade against the glass or other surface to be wiped or cleared.

A related object is to provide a torsion spring connection between the pivotally articulated drive arm parts or sections, which connection enables, during assembly of the parts, selection and setting of initial spring torsion, and after assembly at any time, modification of the torsion setting, for wiper pressure variation, through a considerable range of fine adjustment.

A concomitant object is to provide a wiper force adjusting spring of compact form but relatively great length so supported as to enable selective use of extremely small and extremely great wiping pressures without concentration or localization of bending load on any portion of the spring.

An additional object is the provision of a wiper drive arm assembly which is simple and strong in construction and capable of being mounted and adjusted for suitable wiping force by relatively unskilled persons.

A further specific object is to provide an improved wiper blade saddle mounting on a wiper drive arm, enabling selection and secure maintenance of a large number of angular relationships of the wiper blade and the drive arm assembly as a whole parallel to the wiping plane.

Other objects and features of the invention will become apparent from the following description of the preferred form shown in the drawing wherein:

Fig. 1 is a fragmentary front or plan view of the assembly, i. e. as viewed parallel to the axis of the drive shaft or (usually) from the front of the vehicle equipped with the wiper.

Fig. 2 is a fragmentary side elevation of the assembly prior to being mounted on the drive shaft.

Fig. 3 is a partial central sectional view taken along the line 3—3 on Fig. 1, the mounting head portions of the assembly being shown in elevation in a typical working position with reference to the drive arm generally.

Fig. 4 is a detail perspective view of a torsion spring portion of the assembly.

Fig. 5 and Fig. 6 are detail cross sectional views taken on planes indicated by lines 5—5 and 6—6 respectively on Fig. 3.

The drive arm assembly 1 as indicated above comprises principally a rigid mounting head section 2, a drive arm shell section 3 of tapered channel form, e. g. sheet metal, and a drive arm extension section 4 which may also be of sheet metal channel section loosely telescoped with the web and flange portions of the shell 3 and secured to the web 3a thereof as by spaced rivets 3b or suitable clips (not shown). The extension 4 carries a blade mounting saddle 5 pivotally secured thereto as by a pin or non-clamping rivet 6 and additionally by an adjustment sector device including a clamping bolt 7 and nut 7a. The saddle 5 has a top web 8 and paired depending flanges 9 supporting a suitable pivot pin 10 on which the blade 11 (shown diagrammatically) is pivotally carried in conventional fashion between the depending flanges.

The mounting head 2 is a rigid elongated metal block having a shaft mounting hole 15 substantially complementary to the drive shaft (see S, Fig. 3) and with a narrow slot 16 therethrough (Fig. 1) intersecting the hole so that the thus separated portions 17 can be forced against the shaft as by a clamping bolt 18 passing through aligned openings in the portions 17. The outer or opposite end of the head is bifurcated as will be evident from comparison of Figs. 1, 3 and 6 to provide spaced parallel ears or arms 19 and 19a with aligned apertures 20 and 21 receiving large and small diameter portions 24 and 25 of a pivot pin 22. The pivot pin passes through respective similar circular openings in relatively wide circular ear portions 26a of the paired flanges 26 of shell 3.

The torsion spring 28 is formed of a single piece of metal spring stock or wire, has a helix or coil portion 29, an anchor portion or toe 30 and a wiper pressure force applying arm 31 terminating in a return bend or loop 32 providing spaced upwardly or forwardly curved arm portions 33. To secure the coil portion of the spring generally concentric with the pivot pin 22, and surrounding it in free condition, a torsion adjusting and spring anchor barrel or collar 35 (Figs. 3 and 6) telescopes the pivot pin in splined relation thereto at 36, being supported in position largely by the snug fit of the splines (preferably closely spaced mating serrations) and partly by the arm portions 19 and 19a of the mounting head which the ends of the collar abut. An opening 38 is provided in one side of the barrel to receive the anchoring toe 30 of the spring coil portion 29.

The pivot pin 22 is inserted into the assembly from right toward left, Fig. 6, and is maintained in position, with the spring under the desired initial torque, by a locking device 40 of U-bolt or staple form loosely fitting the drive-shaft-attaching portion of the mounting head 2. The locking device 40 has its parallel ends 40a slidably inserted into diametral openings 41, Fig. 6, of the pin 22 and its side-connecting or loop portion 42 is seated in aligned grooves or depressions 43 in the top or front of the mounting head portions 17, being located a considerable distance away from the pivot pin 22. The ends 40a of the locking device may be of sufficient length, as diagrammatically indicated at 40x, Fig. 2, to enable the loop portion 42 to be moved over the associated end of the head 2, in effecting primary spring adjustment, but without becoming detached from the openings 41 of the pivot pin.

The wiper force applying arm 31 of the spring 28 has its curved arms 33 extending over and resting upon a spring perch or supporting bar 45, Figs. 3 and 5, having a generally cylindrical central body portion 46, threaded to an adjusting screw 48 carried by the shell section 3, and opposite truncated or reduced diameter ends 46'. The spring arm portions 33 press against the truncating ends 46' as illustrated and, being close to the flat end faces of the larger diameter or body portion 46 of the perch or bar, the latter cannot rotate out of place on its adjusting screw 48 because in order so to rotate the short spring arm portions 33 would have to be spread apart a considerable distance. The adjusting screw has a slotted head 49 in contact with the outer face of the web 3a of the drive arm shell; and, in order to maintain the threaded adjustment with the spring perch, a suitable number of wing or nib formations 50 is or are provided on the underside of the head for engagement with approximately complementary radial slots 51 in the web of the shell. The spring arm 31 maintains the nib or nibs seated in the slots.

The web 3a of the shell section 3, toward the mounting head, has a circularly formed housing extension 52 arranged partially to enclose the coil portion 29 of the spring in spaced relation thereto. The extension lies close to the curved crotch surface 54, Fig. 3, partly defining the bifurcations 19 and 19a so that the spring coil and pivot assembly is substantially enclosed toward the front of the vehicle on which the drive arm assembly is mounted. The semi-circular pivot extensions or ears 26a of the shell flanges 26 are received in complementary side face depressions 55 in the mounting head partly defined by respective concentric shoulders 56 (see Fig. 2) so that limiting shoulders at each side are provided at two points one of which is indicated at 57 on Fig. 2. Thereby the mounting head and shell sections 2 and 3 cannot be moved toward each other, as by clockwise rotation of the shell section 3 relative to the mounting head, any farther than as indicated by Fig. 2.

To assemble the sections 2 and 3 with the spring and pivot connecting members—assuming the torsion barrel or collar 35 and the helix portion of the spring are in place—the pin 22 is turned relative to the barrel 35 into the proper position so that, with the arm sections 2 and 3 in the relationship shown by Fig. 2, the U-shaped locking device 40 can easily be slid into place. Insertion of the locking device into place as illustrated determines the primary spring force setting. The threaded connection between the adjusting screw 48 and the spring perch 45 is usually effected after such primary spring force setting has been performed although it may be done either before or after. As soon as the screw 48 has been inserted for a short distance into the threaded opening of the perch the locking device 40 will then be tightly but releasably engaged with the depressions 43, thus holding the entire assembly against unrestrained relative movement of its parts during shipping and handling. Further torsion is placed on the spring when the shell 3 and mounting head are brought into approximate alignment (e. g. operating position) as illustrated in full lines on Fig. 3. After mounting of the head on the shaft S, Fig. 3, the desired yielding blade-pressure adjustment is enabled by manipulation of the screw 48 as will be apparent, the screw being self-locking to maintain the adjustment.

Referring further to the blade mounting saddle 9, the web 8 thereof is preferably maintained in position for angular adjustment about the rivet 6 by a spacer or filler piece 60 seated against respective webs of the extension 4 and the saddle as illustrated. At its outer limit the web 8 of the saddle is extended forwardly and longitudinally of the arm at 61 as at 62 to provide an adjusting sector which is arcuately slotted at 63 to receive the clamping bolt 7. A radially corrugated spring washer is preferably interposed between the sector extension 62 and the web of the drive arm extension 4, thus assisting in retaining the clamping adjustment of the nut 7a against the extension 4. Due to the fact that the rivet 6 does no clamping the saddle is initially free to pivot about the rivet in securing the desired angular adjustment of the blade with reference to the drive arm; and since the point of clamping of the saddle is a considerable distance from the pivot 6 only a small locking force is required to maintain the blade firmly in adjusted position.

I claim:

1. In a wiper drive arm assembly, two sections adapted to be pivotally articulated at overlapping portions thereof, a pivot pin connecting said portions, a spring-anchor barrel splined to the pin and thereby angularly adjustable relative to the pin by detachment of the pin and barrel and reassembly of those elements in differently turned splined relative positions, retaining means detachably associated with one of the sections and engaging the pin to prevent its free rotation in one direction, a coil spring around the barrel and anchored thereto at one end, an arm on the spring extending along the other section, and an adjustable spring perch for the spring arm on said other section.

2. The assembly according to claim 1 wherein said retaining means is a U-shaped member engageable with end portions of the pivot pin and bearing in an open recess of said one section normally to prevent disengagement of the U-shaped member from the pin.

3. In a wiper drive arm, a mounting head bifurcated at its free end, a drive arm shell of channel form embracing the bifurcated end of the head and forming therewith a partial cylindrical chamber, a pin pivotally connecting the head and shell centrally of the chamber, a lock detachably engaging the pin and head to prevent rotation of the pin and detachment thereof from the head, a spring anchor collar surrounding the pin and having a serrated connection therewith enabling angular adjustment of the pin and collar by detachment and reconnection as described, and a coil spring having a toe seated in a radial opening of the collar and a wiper pressure arm operatively connected to the drive arm shell.

4. In a wiper drive arm assembly, a mounting head section, a blade supporting section, a normally non-rotatable pin arranged to pivotally connect the sections, a helical coil spring surrounding said pin, an anchor sleeve device for the spring concentric with the pin supported thereby and splined thereto through a uniform series of serration teeth on the pin and sleeve enabling angular adjustment of the pin relative to the device to any one of a large number of positions consequent upon detachment of the pin and device from each other and reattachment in differently turned relative positions for initially adjusting the effective torsion of the spring, and a free arm on the spring adjustably connected to one of the sections for additional adjustment of the spring torsion.

5. In a wiper drive arm assembly, a mounting head section adapted to be secured to a drive shaft, a blade supporting section and a pin pivotally coupling the mounting head sections at overlapping portions of the sections, a helical coil spring with coils located between said portions and having a terminal arm anchored to one of the drive arm sections, the other terminal of the spring being formed to provide an arm with laterally spaced apart generally paralleled spring-torque-applying portions, a spring perch comprising a bar having a central body with truncated ends, the body having a threaded transverse opening embracing an adjustment screw straddled by the parallel portions of the spring while the latter are in engagement with the truncated end of the bar, said adjustment screw being mounted on the other drive arm section with its principal axis transverse to the axis of the pivot pin.

COLUMBUS R. SACCHINI.

REFERENCES CITED

The following references are of record in the file of this patent:

UNITED STATES PATENTS

| Number | Name | Date |
| --- | --- | --- |
| 1,485,919 | Hein | Mar. 4, 1924 |
| 2,229,718 | Bramming | Jan. 28, 1941 |
| 2,295,620 | Zaiger | Sept. 15, 1942 |
| 2,311,121 | Nette | Feb. 16, 1943 |
| 2,392,670 | Horton | Jan. 8, 1946 |